United States Patent
Morita et al.

(10) Patent No.: US 10,050,550 B2
(45) Date of Patent: Aug. 14, 2018

(54) HIGH-VOLTAGE GENERATION DEVICE AND X-RAY GENERATION DEVICE

(71) Applicant: Hitachi, Ltd., Tokyo (JP)

(72) Inventors: Hiroshi Morita, Tokyo (JP); Toranosuke Takeuchi, Tokyo (JP); Tomoharu Ino, Tokyo (JP); Takuya Domoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 327 days.

(21) Appl. No.: 14/899,215

(22) PCT Filed: Jul. 9, 2014

(86) PCT No.: PCT/JP2014/068293
§ 371 (c)(1),
(2) Date: Dec. 17, 2015

(87) PCT Pub. No.: WO2015/005380
PCT Pub. Date: Jan. 15, 2015

(65) Prior Publication Data
US 2016/0156280 A1  Jun. 2, 2016

(30) Foreign Application Priority Data
Jul. 11, 2013 (JP) ................................. 2013-145115

(51) Int. Cl.
H05G 1/10 (2006.01)
H01J 35/00 (2006.01)
H02M 7/10 (2006.01)
H05G 1/12 (2006.01)

(52) U.S. Cl.
CPC .............. H02M 7/106 (2013.01); H05G 1/12 (2013.01)

(58) Field of Classification Search
CPC .......... H02M 7/106; H02M 3/07; H02M 7/10; H02M 1/088; H02M 2001/0077;
(Continued)

(56) References Cited

U.S. PATENT DOCUMENTS 3,628,125 A * 12/1971 Dedieu ................. H02M 7/103
363/59
3,777,249 A   12/1973 Dumas
(Continued)

FOREIGN PATENT DOCUMENTS

CN     101728202 A    6/2010
EP     0 913 075 B1   5/2003
(Continued)

OTHER PUBLICATIONS

Chinese Office Action received in corresponding Chinese Application No. 201480034051.4 dated Sep. 8, 2016.
International Search Report of PCT/JP2014/068293.

*Primary Examiner* — Irakli Kiknadze
(74) *Attorney, Agent, or Firm* — Mattingly & Malur, PC

(57) ABSTRACT

Downsizing a Cockcroft-Walton high-voltage generation device may cause discharge from the connections of respective components to potentially lack insulation reliability. A Cockcroft-Walton circuit (1) is configured to include capacitors (2a-1 to 2a-4) connected in series and capacitors (2b-1 to 2b-4) connected in series, each having end electrodes (22) at both ends, respectively. One capacitor (2a-1) is electrically connected with the other capacitor (2a-2), which is adjacent in series to the former at a connection (7a-1). The connection (7a-1) is arranged so as not to protrude outside a first space (9) between the end electrode (22) of the one capacitor (2a-1) and the end electrode (22) of the other capacitor (2a-2). Further, the anode of a diode (3a-1) and the cathode of a diode (3b-1) are electrically connected to the connection (7a-1).

14 Claims, 13 Drawing Sheets

(58) Field of Classification Search
CPC .. H02M 3/3376; H02M 7/003; H02M 7/1557;
H05G 1/12; H05G 1/10; H05G 1/06;
H05G 1/08; H05G 1/20; H05G 1/265;
H05G 1/54; H05G 1/24; H05G 1/32;
H05G 1/56; H05G 1/26; H05G 1/34;
H05G 1/36; H05G 1/46; H01J 2235/02;
H01J 2235/087; H01J 2235/12; H01J
2235/086; H01J 35/10; H01J 35/14; H01J
35/26; H01J 2229/964; H01J 29/96; H01J
31/208; H01J 2235/0236; H01J 2235/062;
H01J 2235/083; H01J 2235/1046; H01J
2235/1204; H01J 2235/1262; H01J
2235/16; H01J 2235/20; H01J 2235/205;
H01J 29/48; H01J 35/00; H01J 35/025;
H01J 35/04; A61M 2005/3022; A61M
5/2053; A61M 5/30; B03C 3/41; B03C
3/47; B03C 3/68; B03C 3/74; H01T
23/00; G05F 3/06
USPC .................................. 378/121, 119, 109–118
See application file for complete search history.

(56) References Cited

U.S. PATENT DOCUMENTS

| | | | | |
|---|---|---|---|---|
| 4,033,316 A | * | 7/1977 | Birchenough | F02P 9/007 |
| | | | | 123/598 |
| 4,393,441 A | * | 7/1983 | Enge | H02M 7/103 |
| | | | | 363/126 |
| 4,995,069 A | | 2/1991 | Tanaka | |
| 5,107,412 A | * | 4/1992 | Fuchs | H02M 7/5236 |
| | | | | 363/136 |
| 5,774,349 A | * | 6/1998 | Tichy | H02M 7/103 |
| | | | | 336/200 |
| 5,818,706 A | * | 10/1998 | Wimmer | G01R 15/04 |
| | | | | 363/61 |
| 6,674,836 B2 | * | 1/2004 | Harada | A61B 6/56 |
| | | | | 378/107 |
| 7,050,539 B2 | * | 5/2006 | Loef | H02M 3/285 |
| | | | | 363/15 |
| 7,305,065 B2 | * | 12/2007 | Takahashi | H05G 1/12 |
| | | | | 378/101 |
| 7,379,312 B2 | * | 5/2008 | Baptiste | H05G 1/10 |
| | | | | 323/229 |
| 7,936,544 B2 | * | 5/2011 | Beland | H02M 1/088 |
| | | | | 361/58 |
| 2011/0002445 A1 | * | 1/2011 | Hattrup | H02M 1/40 |
| | | | | 378/101 |

FOREIGN PATENT DOCUMENTS

| | | |
|---|---|---|
| JP | S5548345 U | 3/1980 |
| JP | S5722384 A | 2/1982 |
| JP | H1041093 A | 2/1998 |
| JP | 2004-048905 A | 2/2004 |

* cited by examiner

FIG. 9A
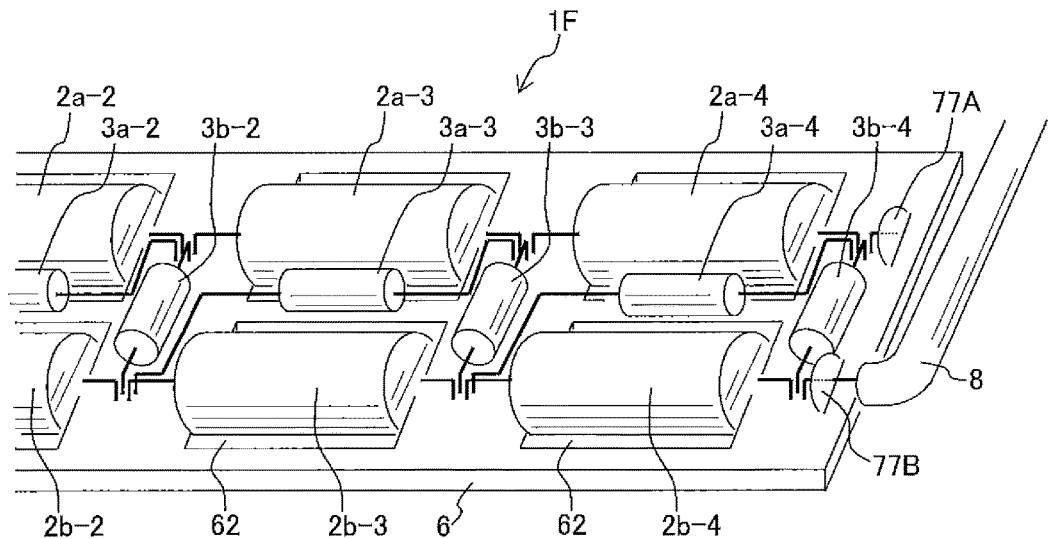
FIG. 9B
FIG. 9C
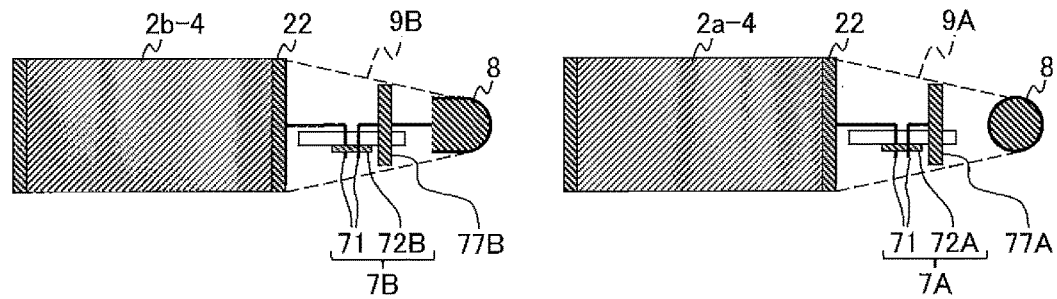
FIG. 9D
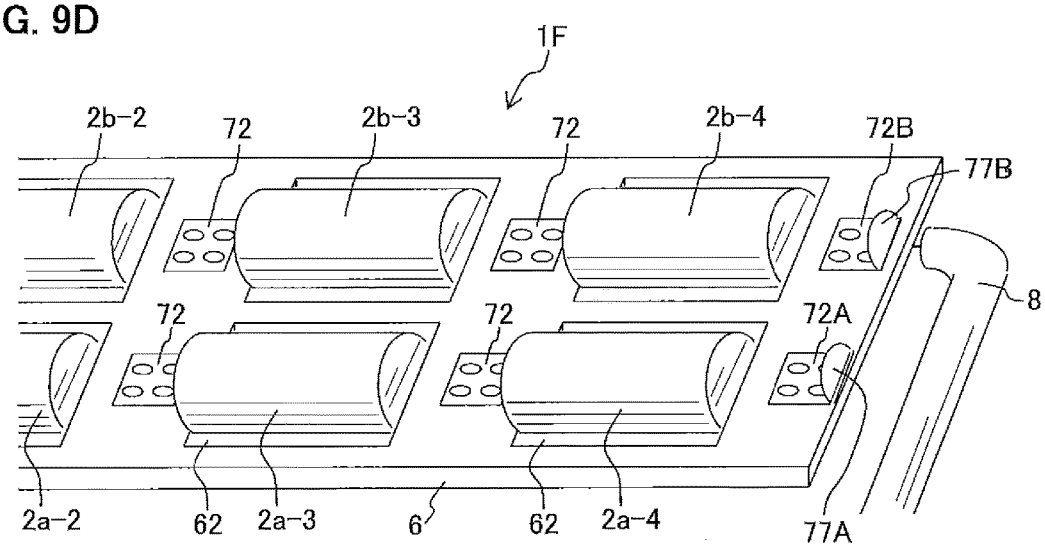

HIGH-VOLTAGE GENERATION DEVICE AND X-RAY GENERATION DEVICE

CROSS-REFERENCE TO RELATED APPLICATION

This application is a U.S. National Stage Application under 35 U.S.C § 371 of International Patent Application No. PCT/JP2014/068293 filed 9 Jul. 2014, which claims the benefit of priority to Japanese Patent Application No. 2013-145115 filed 11 Jul. 2013, the disclosures of all of which are hereby incorporated by reference in their entities. The International Application was published in Japanese on 15 Jan. 2015 as WO2015/005380.

TECHNICAL FIELD

The present invention relates to a high-voltage generation device that generates high voltage to be applied across the two output terminals, and an X-ray generation device using the high-voltage generation device.

BACKGROUND ART

Downsizing a high-voltage generation device has been required in recent years that can be employed in an X-ray generation device for medical use. An X-ray tube of the X-ray generation device for medical use requires an input voltage of a DC 100 kV or more, and then a high-voltage generation device employed in the X-ray generation device is required to generate such a DC voltage. A high-voltage generation device in an X-ray generation device for medical use often adopts a Cockcroft-Walton circuit.

Japanese Patent Application Publication No. 2004-048905 describes in Abstract that PROBLEM TO BE SOLVED is to materialize reducing thickness and to facilitate manufacturing, and SOLUTION TO PROBLEM is "A fitting hole (α) for storing the main body of a diode (Da) is made in a printed board (1), and the main body of the diode (Da) is fitted in the fitting hole (α) from the surface side of the printed board (1), the lead wire of the diode (Da) is soldered to the land pattern (R) at the surface of the printed substrate (1), and a capacitor is also soldered to the land pattern (R) at the surface of the printed board (1)." This allows for achieving the advantageous effects of "materializing reducing thickness because the diode (Da) is half stored in the fitting hole (α)," as described in ADVANTAGEOUS EFFECTS in Abstract of Japanese Patent Application Publication No. 2004-048905.

SUMMARY OF THE INVENTION

Problems to be Solved

The technique described in Japanese Patent Application Publication No. 2004-048905 is effective in downsizing the Cockcroft-Walton circuit. However, for a high-voltage generation device, downsizing and reducing thickness can sometimes be in a trade-off relationship with its insulation reliability. In the Cockcroft-Walton circuit, connections of respective components may cause discharge due to a high electric field if they protrude in an edged shape, to degrade its insulation reliability, even though the electronic components constituting the circuit separately have sufficient voltage resistance and insulation reliability.

In view of such problems, the present invention is intended to provide a high-voltage generation device that allows for suppressing discharge from the connections of respective components to secure its insulation reliability, as well as for downsizing the entire device, and to provide an X-ray generation device using the high-voltage generation device.

Solution to Problems

In order to solve the problems as described above, it is important, for example, to improve arrangement positions and structures of the connections of the respective electronic components. In the high-voltage generation device according to a first aspect of the invention, two or more capacitors, each having terminal electrodes at both ends, are connected in series. A connection, at which two adjacent capacitors are electrically connected in series, is arranged so as not to protrude outside a first space between an end electrode of one capacitor on the connection side and an end electrode of the other capacitor on the connection side. One end of a diode is electrically connected to the connection.

Such an arrangement according to the present invention allows for suppressing discharge from the connections of the respective components constituting the high-voltage generation device, and for downsizing the entire high-voltage generation device.

An X-ray generation device according to the present invention includes the high-voltage generation device.

Such an arrangement according to the present invention allows for suppressing discharge from the connections of the respective components constituting the high-voltage generation device, and for downsizing the entire X-ray generation device.

Advantageous Effects of the Invention

A high-voltage generation device and an X-ray generation device using the high-voltage generation device according to the present invention allow for suppressing discharge from connections of respective components to secure insulation reliability, as well as for downsizing the entire devices.

BRIEF DESCRIPTION OF DRAWINGS

FIGS. 9A to 9D are diagrams showing a configuration of an end portion of a Cockcroft-Walton circuit according to a seventh embodiment;

EMBODIMENTS OF THE INVENTION

Hereinafter, a description will be given in detail of comparative examples for the present invention and embodiments of the present invention, with reference to drawings.

X-ray tubes are roughly classified into anode-grounded ones, each having a cathode at a negative potential and an anode at the ground potential, and neutral-grounded ones, each having a cathode at a negative potential and an anode at a positive potential.

Figure 10:
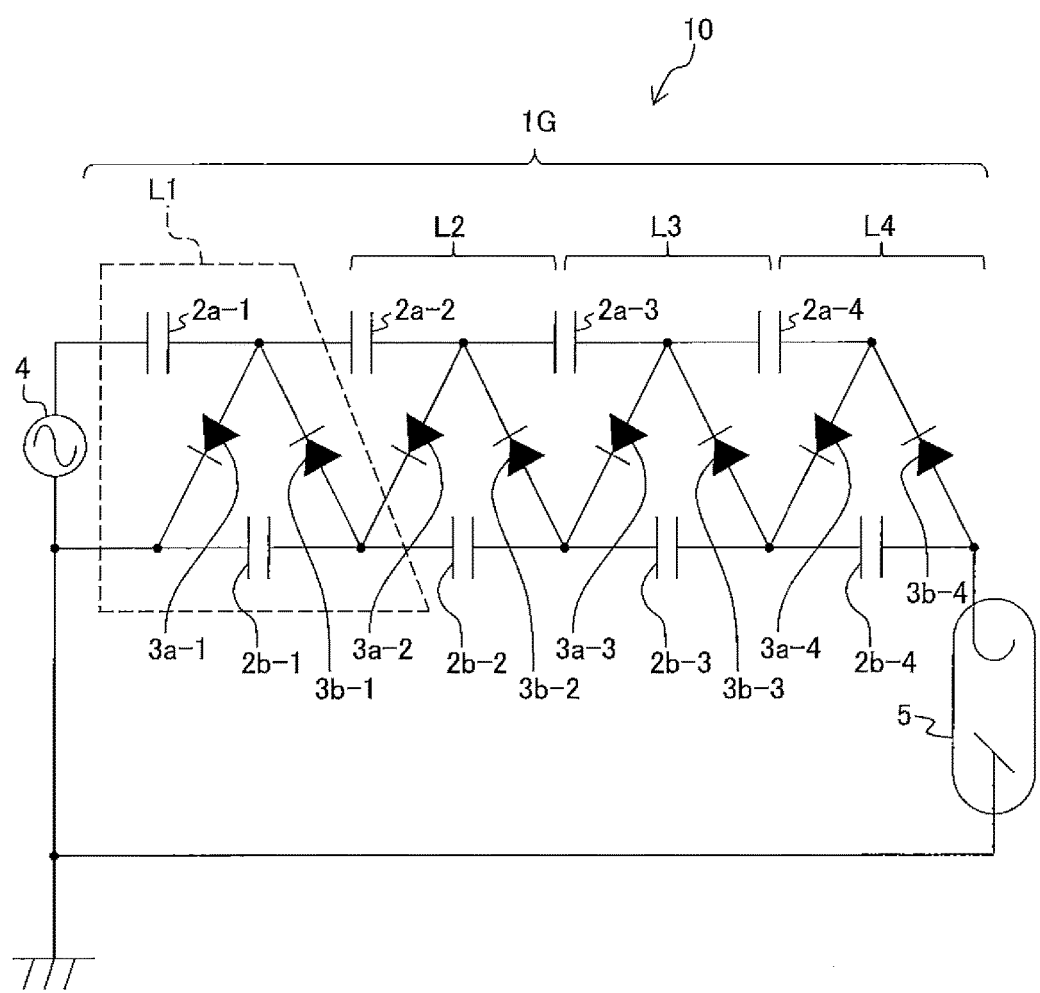
FIG. 10 is a diagram showing an X-ray generation device using an anode-grounded Cockcroft-Walton circuit.

FIG. 10 is a diagram showing a Cockcroft-Walton circuit 1G connected to an anode-grounded X-ray tube 5, and an X-ray generation device 10 using them.

As shown in FIG. 10, the X-ray generation device 10 includes the Cockcroft-Walton circuit 1G as a high-voltage generation device, and the anode-grounded X-ray tube 5. The Cockcroft-Walton circuit 1G is supplied with AC power by an AC power source 4 to apply a high potential difference across the anode and cathode of the X-ray tube 5. The Cockcroft-Walton circuit 1G includes capacitors $2a$-1 to $2a$-4 connected in series, capacitors $2b$-1 to $2b$-4 connected in series, diodes $3a$-1 to $3a$-4, and diodes $3b$-1 to $3b$-4.

Hereinafter, capacitors $2a$-1 to $2a$-4 and capacitor $2b$-1 to $2b$-4 may sometimes be referred to simply as capacitors 2 when no particular distinction is required. Also, diodes $3a$-1 to $3a$-4 and diodes $3b$-1 to $3b$-4 may sometimes be referred to simply as diodes 3 when no particular distinction is required.

The Cockcroft-Walton circuit 1G is configured to include four ladder circuits L1 to L4 connected in series, each having two capacitors 2 and two diodes 3. Each of the ladder circuits L1 to L4 steps an AC voltage down to twice the peak value to allow for applying a very low negative voltage relative to the applied AC voltage to gain a high potential difference.

The ladder circuit L1 is configured to include the capacitors $2a$-1, $2b$-1 and the diodes $3a$-1, $3b$-1. The AC power source 4 has one end connected to one end of the capacitor $2a$-1, while the other end connected to one end of the capacitor $2b$-1 as well as the cathode of the diode $3a$-1 and additionally grounded. The anode of the diode $3a$-1 is connected to the other end of the capacitor $2a$-1 and the cathode of the diode $3b$-1. The anode of the diode $3b$-1 is connected to the other end of the capacitor $2b$-1. Thus, the other end of the capacitor $2b$-1 is applied with a negative voltage twice the peak value of the AC voltage.

The ladder circuit L2 is similarly configured to include the capacitors $2a$-2, $2b$-2 and diodes $3a$-2, $3b$-2. One end of the capacitor $2b$-2 is connected with the other end of the capacitor $2b$-1 in the ladder circuit L1. The other end of the capacitor $2b$-2 is applied with a negative voltage four times the peak value of the AC voltage.

The ladder circuit L3 is similarly configured to include the capacitors $2a$-3, $2b$-3 and the diodes $3a$-3, $3b$-3. One end of the capacitor $2b$-3 is connected with the other end of the capacitor $2b$-2 in the ladder circuit L2. The other end of the capacitor $2b$-3 is applied with a negative voltage six times the peak value of the AC voltage.

The ladder circuit L4 is similarly configured to include the capacitors $2a$-4, $2b$-4 and the diodes $3a$-4, $3b$-4. One end of the capacitor $2b$-4 is connected with the other end of the capacitor $2b$-3 in the ladder circuit L3. The other end of the capacitor $2b$-4 is applied with a negative voltage eight times the peak value of the AC voltage. The other end of the capacitor $2b$-4 is the output terminal of the Cockcroft-Walton circuit 1G to be connected to the cathode of the X-ray tube 5 for applying a high negative potential. The anode of the X-ray tube 5 is grounded.

Thus, the AC power supply 4 is connected across the capacitors 2 and the diodes 3 that are connected in a ladder shape to allow for applying a high potential difference across the X-ray tube 5 to generate X-rays. Incidentally, the number of the ladder circuits L1 to L4 is not limited to four and can be any number.

Figure 11:
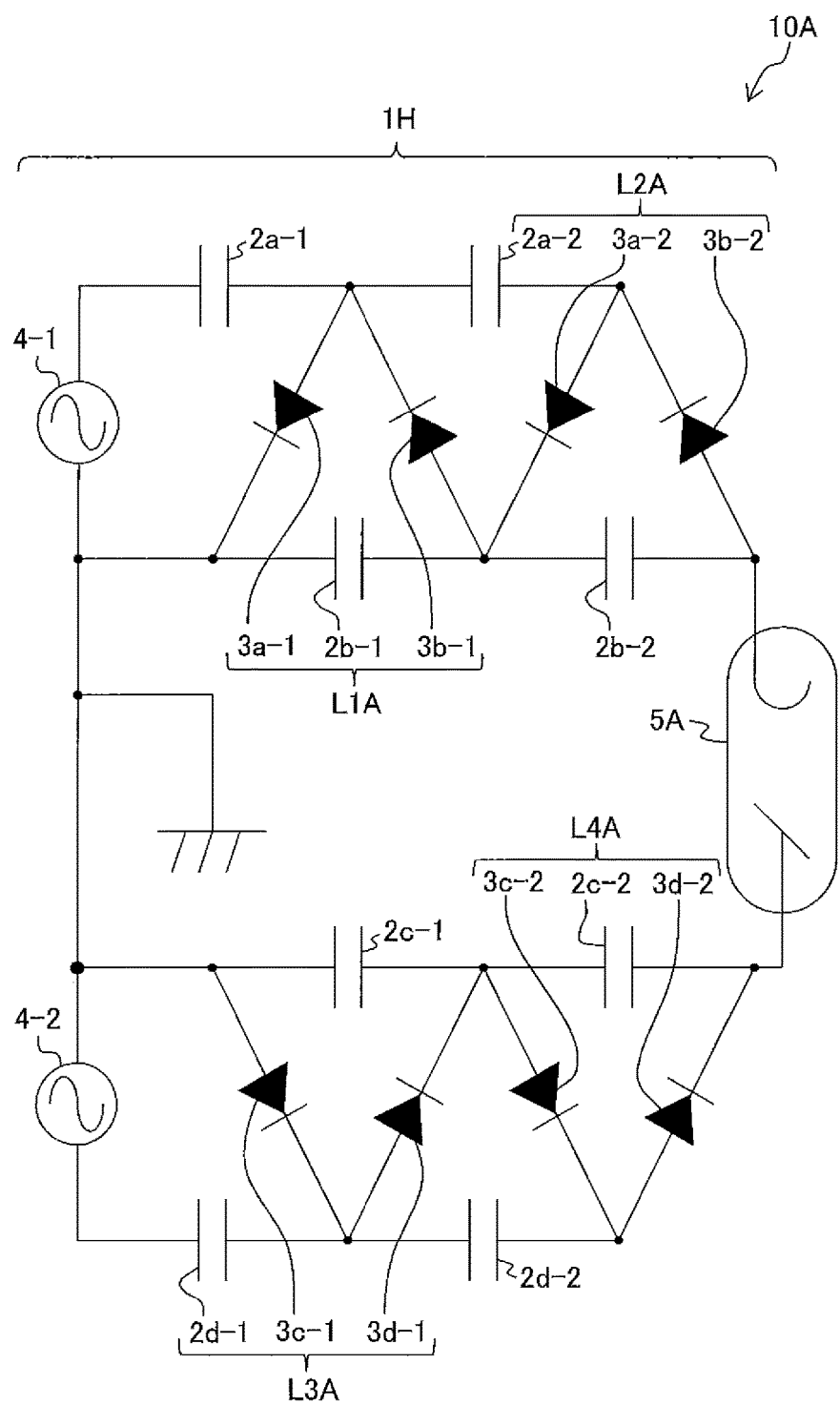
FIG. 11 is a diagram showing an X-ray generation device using a neutral-grounded Cockcroft-Walton circuit.

FIG. 11 is a diagram showing a Cockcroft-Walton circuit 1H connected to a neutral-grounded X-ray tube 5A and an X-ray generation device 10A using them.

As shown in FIG. 11, the X-ray generation device 10A includes the Cockcroft-Walton circuit 1H and the neutral-grounded X-ray tube 5A. The Cockcroft-Walton circuit 1H is supplied with AC power by an AC power source 4 to apply a high potential difference across the X-ray tube 5A. The Cockcroft-Walton circuit 1H includes capacitors $2a$-1, $2a$-2 connected in series, capacitors $2b$-1, $2b$-2 connected in series, capacitors $2c$-1, $2c$-2 connected in series, capacitors $2d$-1, $2d$-2 connected in series, diodes $3a$-1, $3a$-2, diodes $3b$-1, $3b$-2, diodes $3c$-1, $3c$-2, and diodes $3d$-1, $3d$-2.

The Cockcroft-Walton circuit 1H is configured to include two ladder circuits L1A, L2A connected in series, each having two capacitors 2 and two diodes 3, and powered by the AC power source 4-1 to apply a high negative potential to the cathode of the X-ray tube 5A. The Cockcroft-Walton circuit 1H is further configured to include two ladder circuits L3A, L4A connected in series, each having two capacitors 2 and two diodes 3, and powered by the AC power source 4-2 to apply a high positive potential to the anode of the X-ray tube 5A.

The ladder circuit L1A is configured as in the ladder circuit L1 to include the capacitors $2a$-1, $2b$-1 and the diodes $3a$-1, $3b$-1. One end of the capacitor $2b$-1 is grounded, and the other end is applied with a negative voltage twice the peak value of the AC voltage.

The ladder circuit L2A is also configured to include the capacitors $2a$-2, $2b$-2 and the diodes $3a$-2, $3b$-2. One end of the capacitor $2b$-2 is connected with the other end of the capacitor $2b$-1. The other end of the capacitor $2b$-2 is applied with a negative voltage four times the peak value of the AC voltage.

The ladder circuit L3A is configured to include the capacitors $2c$-1, $2d$-1 and the diodes $3c$-1, $3d$-1. The AC power source 4-2 has one end connected to one end of the capacitor $2d$-1, while the other end connected to one end of the capacitor $2c$-1 as well as the anode of the diode $3c$-1 and additionally grounded. The other end of the capacitor $2d$-1 is connected with the cathode of the diode $3c$-1 and the anode of the diode $3d$-1. The cathode of the diode $3d$-1 is connected to the other end of the capacitor $2c$-1. With this configuration, the other end of the capacitor 2c-1 is applied with a positive voltage twice the peak value of the AC voltage.

The ladder circuit L4A is configured as in the ladder circuit L3A to include the capacitors 2c-2, 2d-2 and the diodes 3c-2, 3d-2. One end of the capacitor 2c-2 is connected with the other end of the capacitor 2c-1. The other end of the capacitor 2c-2 is applied with a positive voltage four times the peak value of the AC voltage.

Such a configuration of the Cockcroft-Walton circuit 1H allows for applying a voltage eight times the peak value of the AC voltage across the anode and cathode of the X-ray tube 5A. Thus, connecting the AC power supply 4-1, 4-2 respectively with sets of the capacitors 2 and the diodes 3, each set being connected in a ladder shape, and applying a high voltage across the X-ray tube 5A allows for generating X-rays.

FIRST COMPARATIVE EXAMPLE

Figure 12:
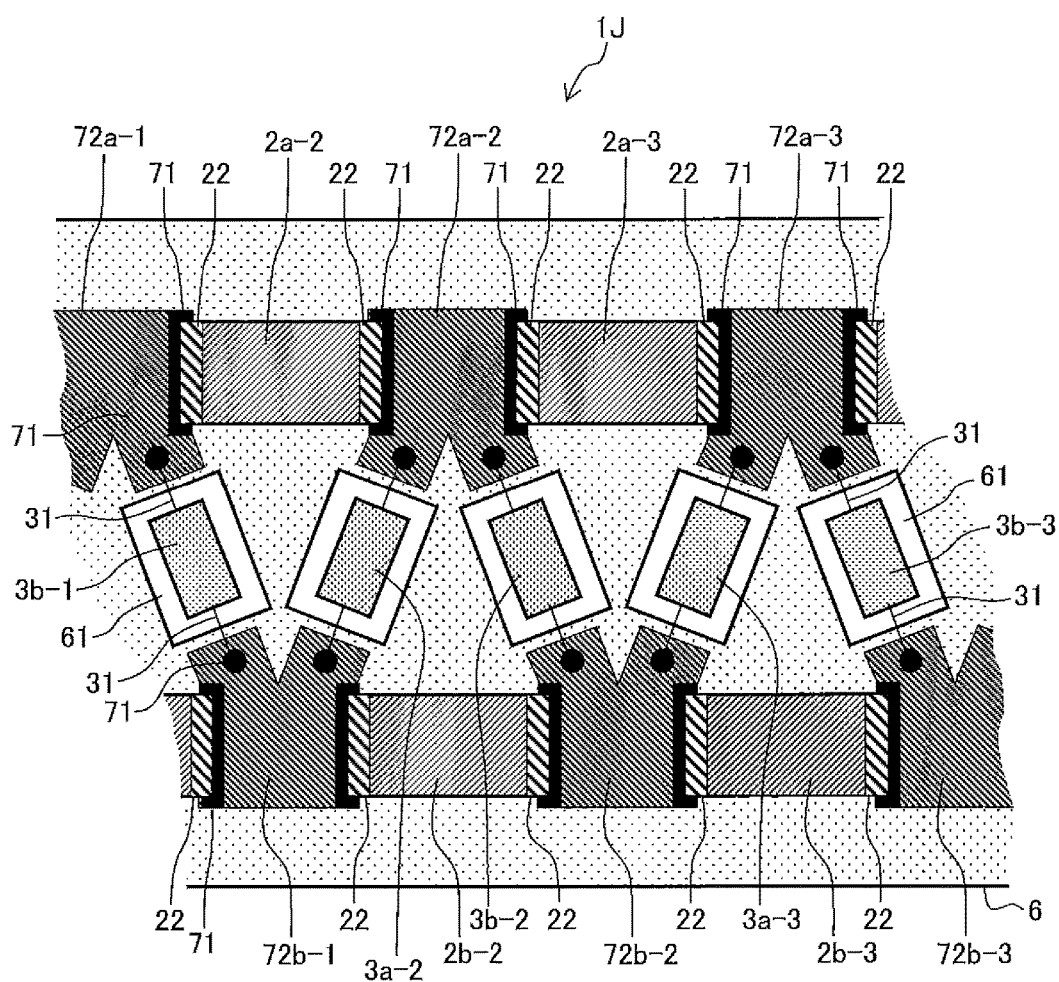
FIG. 12 is a diagram showing a part of a printed substrate of a Cockcroft-Walton circuit in a first comparative example.

FIG. 12 is a plan view showing a part of a printed substrate 6 constituting a Cockcroft-Walton circuit 1J in a first comparative example.

The Cockcroft-Walton circuit 1J in the first comparative example is configured as in the Cockcroft-Walton circuit 1G in FIG. 10. The Cockcroft-Walton circuit 1J is formed with, and configured to include, land patterns 72a-1 to 72a-3 and land patterns 72b-1 to 72b-3 on the printed substrate 6. Hereinafter, the land patterns 72a-1 to 72a-3 and the land patterns 72b-1 to 72b-3 may sometimes be described simply as the land patterns 72 when no particular distinction is required. The printed substrate 6 is further arranged with cavities 61.

The land patterns 72a-1, 72a-2 are electrically connected via solders 71 with end electrodes 22 of the capacitor 2a-2. The capacitor 2 is a surface-mount chip capacitor. The land pattern 72a-1 is electrically connected by the solder 71 with a lead wire 31 of one end of the diode 3b-1. The land pattern 72b-1 is electrically connected by the solder 71 with the lead wire 31 of the other end of the diode 3b-1.

Each diode 3 is inserted in the cavity 61 of the printed substrate 6 to allow for reducing the thickness of the printed substrate 6 after the components are mounted thereon. This allows for forming the Cockcroft-Walton circuit 1J to be thin and small. Other land patterns 72a-2, 72a-3, 72b-2, 72b-3 are also configured in the same way.

For a high-voltage generation device, thinning and downsizing are important, but securing insulation reliability against high voltage is also important. The land pattern 72 in the first comparative example has a thickness of several ten μm, and when a high voltage is applied, a high electric field may be produced at vertex portions or edges of its own to cause discharge.

Even if the diodes 3b-1 to 3b-3 and the diodes 3a-2, 3a-3 are inserted into the cavities 61 of the substrate, the diodes 3 structurally have no function to alleviate the electric field around the land patterns 72 to potentially lack insulation reliability.

SECOND COMPARATIVE EXAMPLE

Figure 13A:
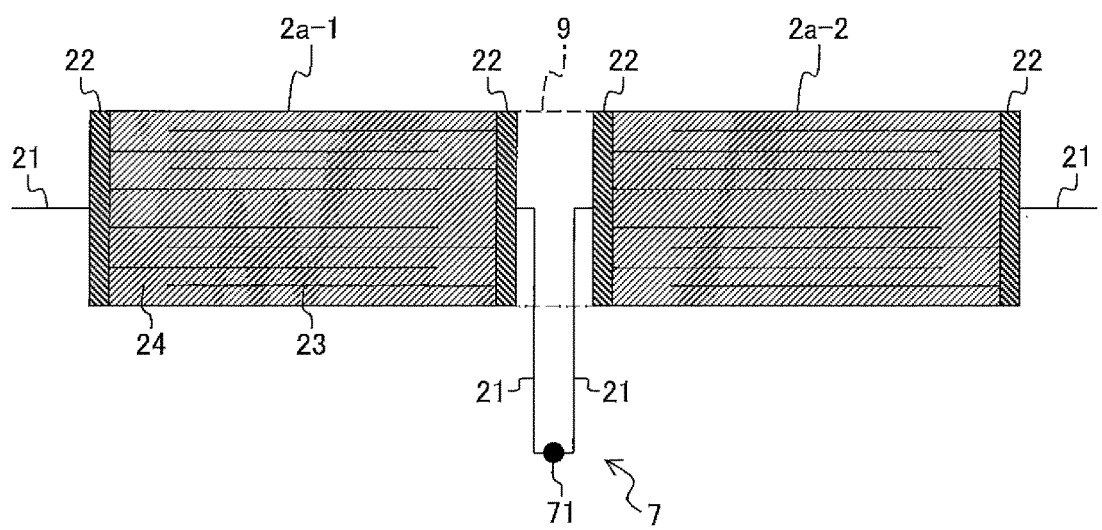
FIGS. 13A and 13B are diagrams showing a structure of electrical connection between capacitors in a second comparative example.
Figure 13B:
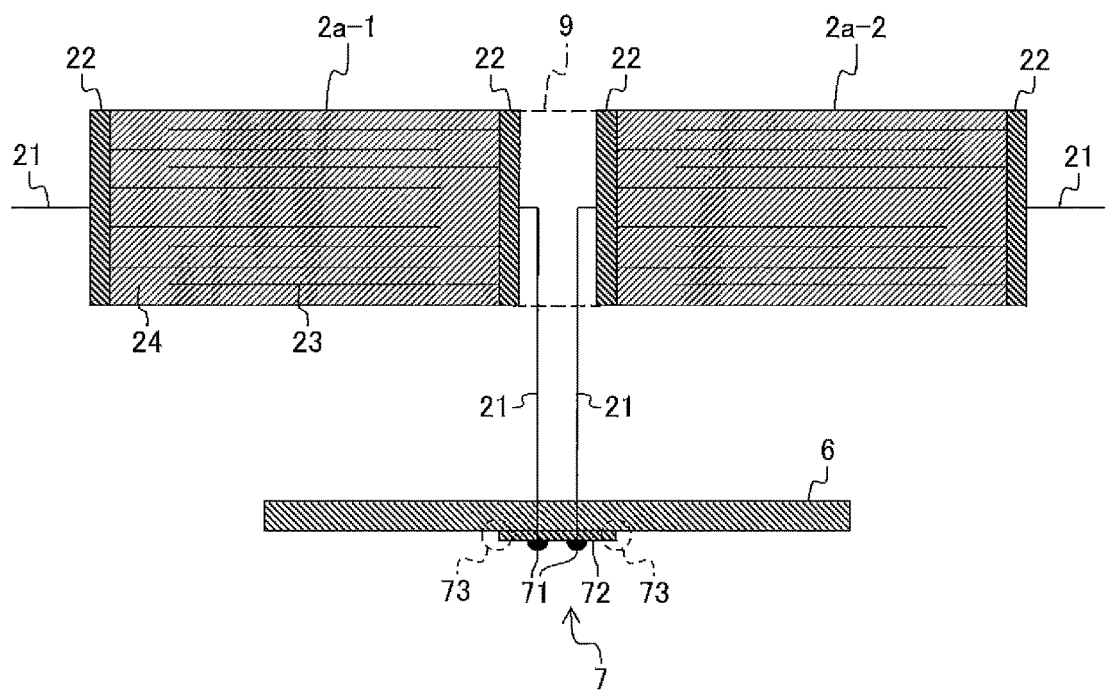

FIGS. 13A and 13B are cross-sectional views showing an electrical connection structure of a film capacitor or ceramic capacitor in the second comparative example. FIG. 13A is a cross-sectional view of a structure where the two lead wires 21 are directly connected. FIG. 13B is a cross-sectional view of a structure where the two lead wires 21 are connected through the printed substrate 6.

As shown in FIG. 13A, a dielectric 24 is partitioned by electrodes 23a in each of the capacitors 2a-1, 2a-2. Hereinafter, the capacitors 2a-1, 2a-2 will simply be referred to as capacitors 2 when no particular distinction is required. The electrodes 23 are electrically connected to the end electrodes 22 arranged at both ends of the capacitor 2.

The lead wires 21 included in the capacitors 2a-1, 2a-2 are bent and connected with each other by the solder 71 at a position far from the capacitors 2, in order to connect the capacitor 2a-1 and the capacitor 2a-2. Note that the lead wires 21 are not limited to be connected by soldering, and may be electrically connected such as by a pin connection or a screw connection. This structure allows the capacitors 2a-1, 2a-2 to be arranged closely with each other to downsize the entire device, and the lead wires 21 can efficiently be connected by any of the methods such as soldering, a pin connection, and a screw connection. However, this structure has a connection 7 protruded in an edge shape, and may have a high electric field produced at a vertex portion or edge of the connection 7 in an edge shape to cause discharge if a high potential difference is applied across the lead wires 21. Thus, this structure may lack insulation reliability.

The capacitors 2a-1, 2a-2 in FIG. 13B are configured as in those in FIG. 13A.

The lead wire 21 included in the capacitor 2a-1 and the lead wire 21 included in the capacitor 2a-2 are bent in order to connect the capacitor 2a-1 and the capacitor 2a-2. Both the lead wires 21 are electrically connected by solder 71 at a position remote from the capacitors 2 and on the land pattern 72 formed on the printed substrate 6. This structure allows the capacitors 2a-1, 2a-2 to be arranged closely with each other, as in the example shown in FIG. 13A, to downsize the entire device and the lead wires 21 can efficiently be connected by soldering. However, this structure has the connection 7 protruded in an edge shape as well as an edge portion 73 formed at an edge of the land pattern 72, and may have a high electric field produced at an vertex of the connection 7 in an edge shape or the edge portion 73 to cause discharge if a high potential difference is applied across the lead wires 21. Thus, this structure may lack insulation reliability.

First Embodiment

Figure 1A:
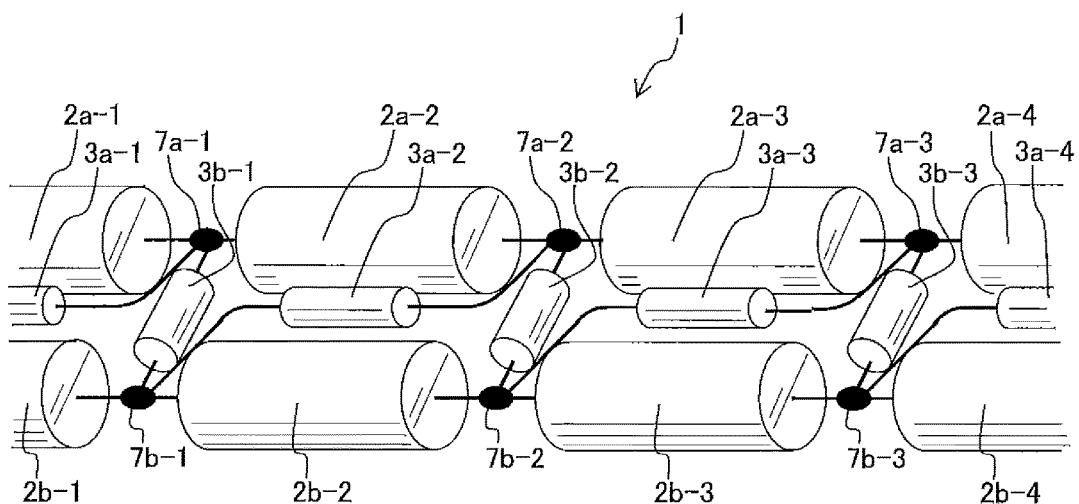
FIGS. 1A and 1B are diagrams showing a partial configuration of a Cockcroft-Walton circuit according to a first embodiment.
Figure 1B:
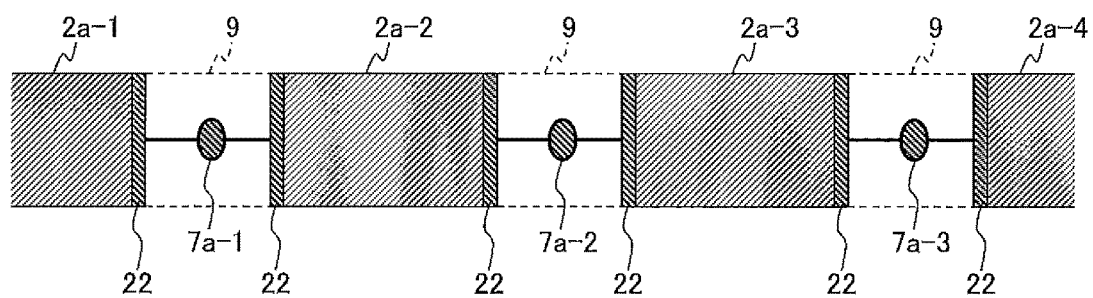

FIGS. 1A and 1B are diagrams showing a partial configuration of a Cockcroft-Walton circuit 1 in a first embodiment. The Cockcroft-Walton circuit 1 in FIGS. 1A and 1B illustrate a part of a specific structure of the Cockcroft-Walton circuit 1G in FIG. 10. FIG. 1A is a perspective view of the Cockcroft-Walton circuit 1. FIG. 1B is a cross-sectional view of a series connection of the capacitors 2a-1 to 2a-4 in the Cockcroft-Walton circuit 1.

As shown in FIG. 1A, the capacitors 2a-1 to 2a-4 constituting the Cockcroft-Walton circuit 1 as a high-voltage generation device each have the end electrodes 22 at both ends, and are connected in series to be arranged substantially in a straight line. The capacitor 2b-1 to 2b-4 constituting the Cockcroft-Walton circuit 1 each have the end electrodes 22 similarly at both ends and are connected in series to be arranged substantially in a straight line. Each capacitor 2 is a film capacitor.

The capacitors 2a-1 to 2a-4 and the diodes 3 are electrically connected to respective connections 7a-1 to 7a-3. At the connection 7a-1, the capacitor 2a-1 as one of a pair is electrically connected with the capacitor 2a-2 as the other of the pair, which is adjacent in series to the one of the pair. Further, the connection 7a-1 is electrically connected with the anode of the diode 3a-1 and the cathode of the diode 3b-1. Each diode 3 is a semiconductor rectifier element.

At the connection 7a-2, the capacitors 2a-2 as one of a pair is electrically connected with the capacitor 2a-3 as the other of the pair, which is adjacent in series to the one of the pair. Further, the connection 7a-2 is electrically connected with the anode of the diode 3a-2 and the cathode of the diode 3b-2.

At the connection 7a-3, the capacitors 2a-3 as one of a pair is electrically connected with the capacitor 2a-4 as the other of the pair, which is adjacent in series to the one of the pair. Further, the connection 7a-3 is electrically connected with the anode of the diode 3a-3 and the cathode of the diode 3b-3.

Similarly, the capacitors 2b-1 to 2b-4 and the diodes 3 are electrically connected to respective connections 7b-1 to 7b-3. Hereinafter, the connections 7a-1 to 7a-3 and the connections 7b-1 to 7b-3 are sometimes described simply as connections 7 when no particular distinction is required.

Each connection 7 of the first embodiment is electrically connected by soldering. However, the connection method is not limited to soldering, and other methods such as crimp contacting and screw fastening can be used for suitable connection. Each capacitor 2 is a film capacitor. The Cockcroft-Walton circuit 1 is covered with a solid insulator such as epoxy resin.

As shown in FIG. 1B, the connection 7a-1 is enclosed in a first space 9 formed by the end electrode 22 of the capacitor 2a-1 as one of a pair, and the end electrode 22 of the capacitor 2a-2 as the other of the pair, which is adjacent in series to the one of the pair, and is arranged so as not to protrude outside the first space 9. The end electrode 22 of the capacitor 2a-1 as one of a pair, has the same potential as the end electrode 22 of the capacitor 2a-2 as the other of the pair, which is adjacent in series to the one of the pair, to make the electric field in the first space 9 zero. The reason that the electric field in the space between the capacitors 2 can be made zero as described above is because the capacitors 2 include the end electrodes 22 at both ends. On the other hand, the diode 3 has no such end structure to fail to form a space where the electric field is zero.

Therefore, no electric field is produced even if the connection 7a-1 has one or more protrusions, for example, causing no discharge. Other connections 7a-2, 7a-3 as well as the connections 7b-1 to 7b-3 in FIG. 1A are also configured in the same way, to allow for suppressing discharge. This allows for securing insulation reliability of the Cockcroft-Walton circuit 1, and for downsizing the entire device.

Modification of First Embodiment

Figure 2A:
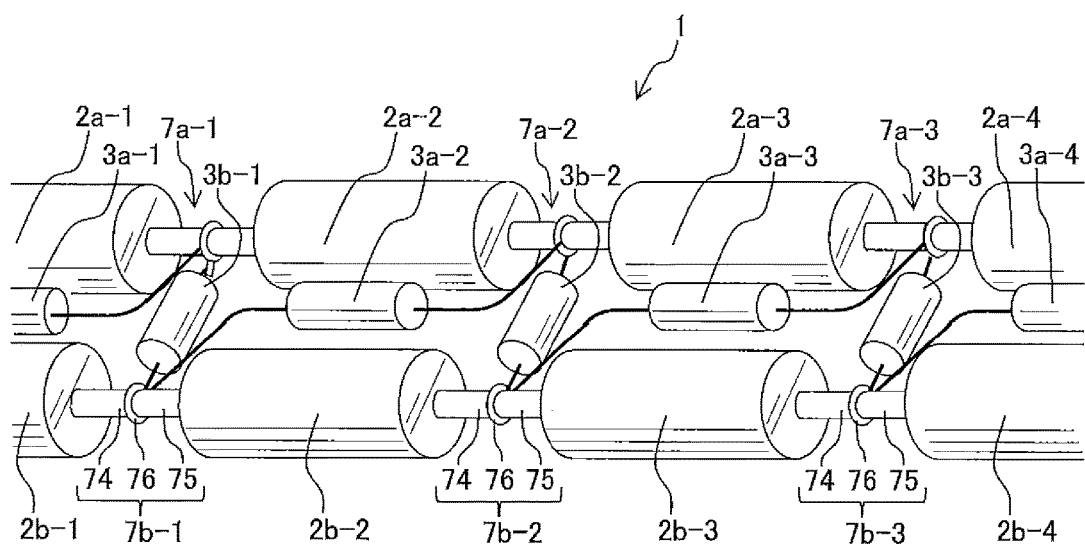
FIGS. 2A and 2B are diagrams showing a partial configuration of a Cockcroft-Walton circuit according to a modification of the first embodiment.
Figure 2B:
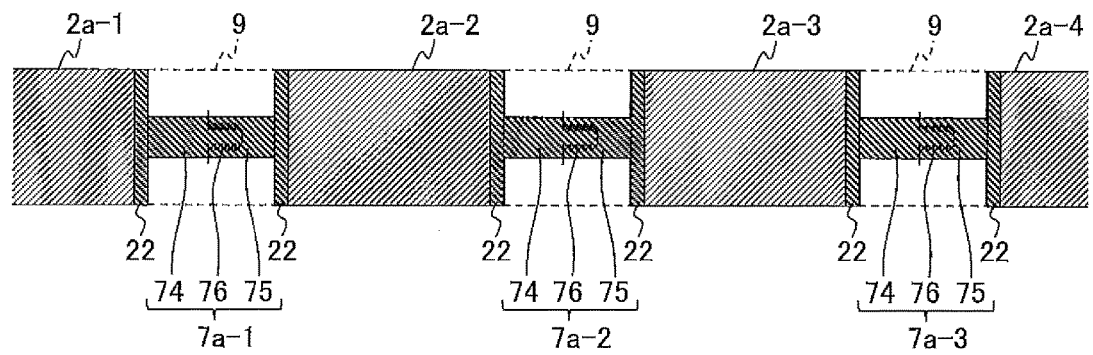

FIGS. 2A and 2B are diagrams showing a partial configuration of the Cockcroft-Walton circuit 1 in a modification of the first embodiment. The Cockcroft-Walton circuit 1 in FIGS. 2A and 2B illustrate a part of a specific structure of the Cockcroft-Walton circuit 1G in FIG. 10. FIG. 2A is a perspective view of the Cockcroft-Walton circuit 1. FIG. 2B is a cross-sectional view of a series connection of the capacitors 2a-1 to 2a-4 in the Cockcroft-Walton circuit 1.

As shown in FIG. 2A, each capacitor 2 in the modification of the first embodiment includes a male screw 74 on one end and a female screw 75 on the other end. Each diode 3 has crimp contacts 76 crimped to the lead wires 31.

At the connection 7a-1, the male screw 74 of the capacitor 2a-1 as one of a pair, is fastened to the female screw 75 of the capacitor 2a-2 as the other of the pair, which is adjacent in series to the one of the pair. The crimp contact 76 arranged on the anode of the diode 3a-1 and the crimp contact 76 arranged on the cathode of the diode 3b-1 are sandwiched between the male screw 74 and the female screw 75 for electrically connecting to the connection 7a-1.

Similarly, the capacitors 2a-2 to 2a-4 and the diodes 3 are electrically connected to the respective connections 7a-2, 7a-3. The capacitors 2b-1 to 2b-4 and the diodes 3 are electrically connected to the respective connections 7b-1 to 7b-3.

As shown in FIG. 2B, the connection 7a-1 is arranged so as to be enclosed in the first space 9 formed by the end electrode 22 of the capacitor 2a-1 as one of a pair, and the end electrode 22 of the capacitor 2a-2 as the other of the pair, which is adjacent in series to the one of the pair. The end electrode 22 of the capacitor 2a-1 as one of a pair, and the end electrode 22 of the capacitor 2a-2 as the other of the pair, which is adjacent in series to the one of the pair, have the same potential to make the electric field in the first space 9 field zero. Then, no electric field is produced even if the connection 7a-1 has one or more protrusions, for example, causing no discharge.

The connection 7a-2 is arranged in the same way so as to be enclosed in the first space 9 formed by the end electrode 22 of the capacitor 2a-2 as one of a pair, and the end electrode 22 of the capacitor 2a-3 as the other of the pair, which is adjacent in series to the one of the pair. The connection 7a-3 is arranged in the same way so as to be enclosed in the first space 9 formed by the end electrode 22 of the capacitor 2a-3 as one of a pair, and the end electrode 22 of the capacitor 2a-4 as the other of the pair, which is adjacent in series to the one of the pair. Other connections 7 are also arranged in the same way. This allows for securing insulation reliability and downsizing the entire device.

In addition, the crimp contacts 76 are crimped between the male screw 74 and the female screw 75, and then the male screw 74 and the female screw 75 are fastened to electrically connect the diode 3 to the connection 7. This eliminates soldering to allow for improving efficiency in manufacturing the device.

Second Embodiment

Figure 3A:
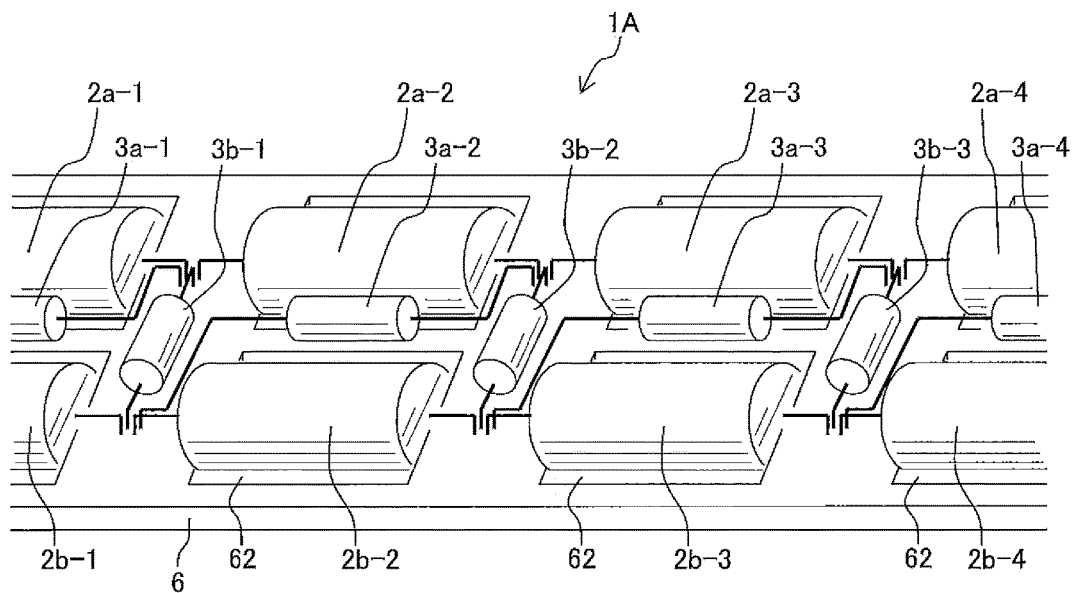
FIGS. 3A and 3B are diagrams showing a partial configuration of a Cockcroft-Walton circuit according to a second embodiment.
Figure 3B:
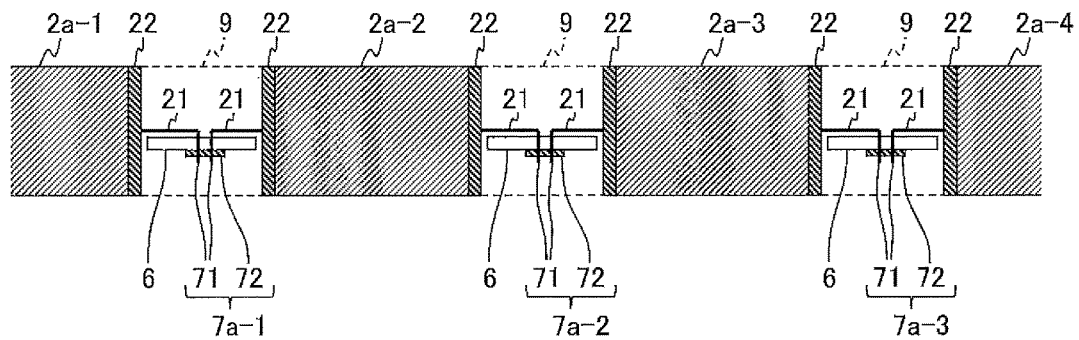

FIGS. 3A and 3B are diagrams showing a partial configuration of a Cockcroft-Walton circuit 1A in a second embodiment. The Cockcroft-Walton circuit 1A in FIGS. 3A and 3B illustrate a part of a specific structure of the Cockcroft-Walton circuit 1G in FIG. 10. FIG. 3A is a perspective view of the Cockcroft-Walton circuit 1A. FIG. 3B is a cross-sectional view of a series connection of the capacitors 2a-1 to 2a-4 in the Cockcroft-Walton circuit 1A.

As shown in FIG. 3A, the Cockcroft-Walton circuit 1A in the second embodiment has the capacitors 2 and the diodes 3 mounted on the printed substrate 6. The printed substrate 6 is excavated to have the cavities 62 fitted with the capacitors 2a-1 to 2a-4 and capacitors 2b-1 to 2b-4.

The capacitors 2a-1 to 2a-4 each have the end electrodes 22 at both ends (see FIG. 1A) as in the first embodiment, and are connected in series to be arranged substantially in a straight line. The capacitors 2b-1 to 2b-4 each have the end electrodes 22 at both ends (see FIG. 1A) in the same way, and are connected and arranged similarly.

As shown in FIG. 3B, one end of the capacitor 2a-1, one end of the capacitor 2a-2, the anode of the diode 3a-1, and the cathode of the diode 3b-1 are electrically connected to the land pattern 72 on the printed substrate 6 by solder 71, to constitute the connection 7a-1. Other connections 7 are also configured in the same way.

The land pattern 72 is thin, as thick as several tens of μm, and may cause discharge at end portions if an electric field is produced around the land pattern 72.

The land pattern 72 constituting the connection 7a-1 is inserted with the lead wire 21 of the capacitor 2a-1 as one of a pair, and the lead wire 21 of the capacitor 2a-2 as the other of the pair, which is adjacent in series to the one of the pair, for electrical connection by the solder 71. The land pattern 72 constituting the connection 7a-1 is enclosed in the first space 9 formed by the end electrode 22 of the capacitor 2a-1 as one of a pair, and the end electrode 22 of the capacitor 2a-2 as the other of the pair, which is adjacent in series to the one of the pair, and is arranged so as not to protrude outside the first space 9.

The end electrode 22 of the capacitor 2a-1 and the end electrode 22 of the capacitor 2a-2, which is adjacent in series to the one of the pair, have the same potential to make the electric field in the first space 9 zero. Then, no electric field is produced even if peripheral edges of the land pattern 72 and/or the solder 71 have one or more protrusions, causing no discharge. This allows for securing insulation reliability of the Cockcroft-Walton circuit 1A, and for downsizing the entire device.

Figure 4A:
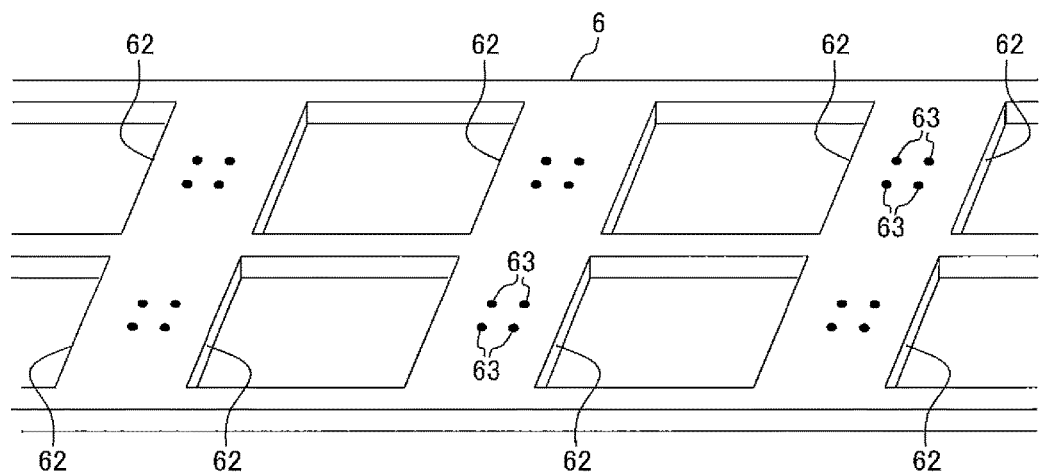
FIGS. 4A and 4B are diagrams showing a substrate of the Cockcroft-Walton circuit according to the second embodiment.
Figure 4B:
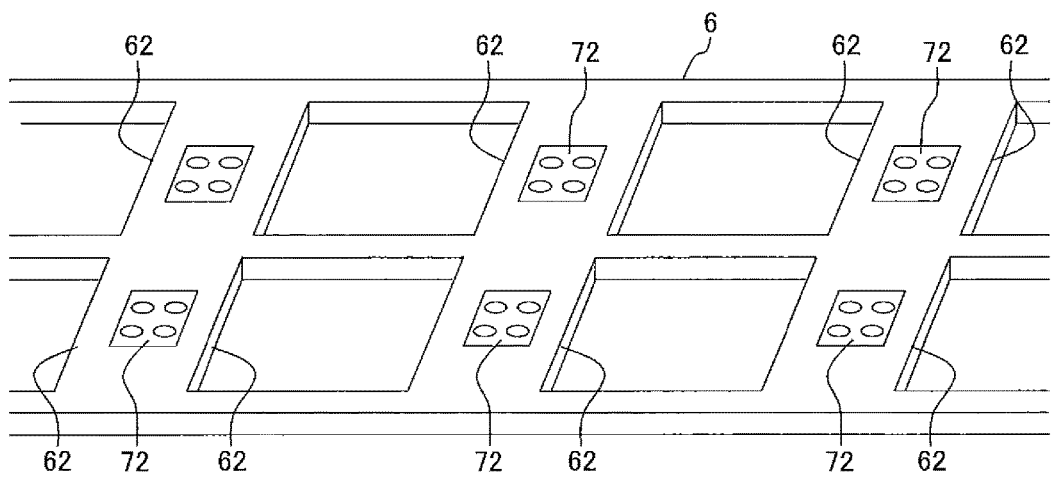

FIGS. 4A and 4B are diagrams showing the printed substrate 6 of the Cockcroft-Walton circuit 1A in the second embodiment. FIG. 4A is a perspective view showing a front surface of the printed substrate 6. FIG. 4B is a perspective view showing a back surface of the printed substrate 6.

As shown in FIG. 4A, the printed substrate 6 is excavated to have cavities 62 and holes 63 for fitting the capacitors 2, respectively. The holes 63 are made for inserting the lead wires 21 of the capacitors 2 or lead wires of the diodes 3.

As shown in FIG. 4B, the land patterns 72 are formed on the back surface of the printed substrate 6 in correspondence to positions of the holes 63 (see FIG. 4A). For manufacturing the Cockcroft-Walton circuit 1A, the capacitors 2 are fitted into the cavities 62, the lead wires 21 of the capacitors 2 and the lead wires 31 of the diodes 3 are inserted into the holes 63, and then the land patterns 72 on the back surface are soldered. Thus, the solder 71 and the land pattern 72 constitute the connection 7 to be electrically connected with the capacitors 2 and the diode 3.

The cavities 62 are formed on the printed substrate 6 such that the capacitors 2 are fitted into the cavities 62. Thus, each connection 7 is arranged so as to be enclosed in the first space 9 formed by the end electrode 22 of the capacitor as one of a pair, and the end electrode 22 of the capacitor as the other of the pair, which is adjacent in series to the one of the pair. The end electrode 22 of the capacitor as one of a pair, and the end electrode 22 of the capacitor as the other of the pair, which is adjacent in series to the one of the pair, have the same potential to make the electric field in the first space 9 zero. Then, no electric field is produced even if the connection 7 has one or more protrusions, for example, causing no discharge. This allows for securing insulation reliability, and for downsizing the entire device.

In addition, the Cockcroft-Walton circuit 1A has a structure in which the capacitors 2 and the diodes 3 are mounted on the printed substrate 6, and then can be suitably manufactured by an electronic component mounting machine.

Third Embodiment

Figure 5A:
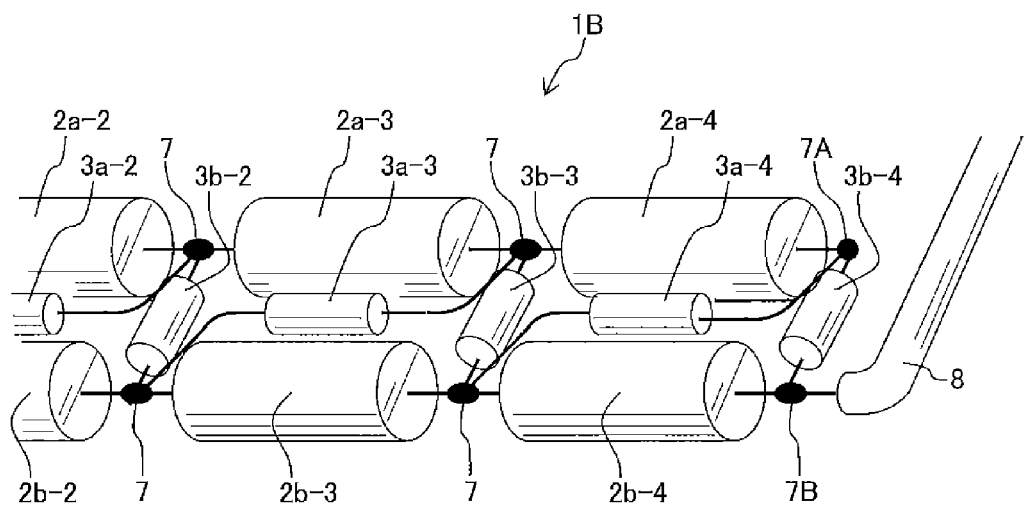
FIGS. 5A to 5C are diagrams showing a configuration of an end portion of a Cockcroft-Walton circuit according to a third embodiment.
Figure 5B:
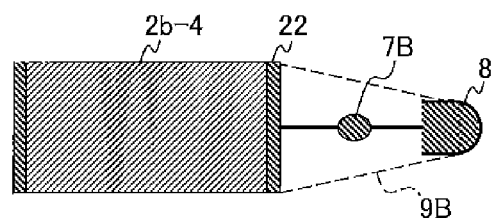
Figure 5C:
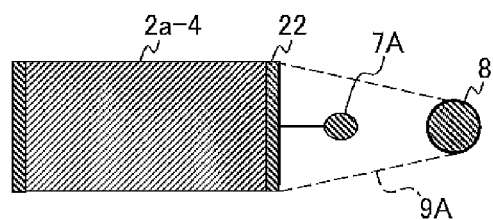

FIGS. 5A to 5C are diagrams showing a configuration of an end portion of a Cockcroft-Walton circuit 1B in a third embodiment. FIG. 5A is a perspective view of the end portion of the Cockcroft-Walton circuit 1B. FIG. 5B is a cross-sectional view around a connection 7B where the potential difference has the largest value. FIG. 5C is a cross-sectional view around a connection 7A where the potential difference has the second largest value.

As shown in FIG. 5A, the connection 7B is a second connection electrically connected with the capacitor 2b-4, the anode of the diode 3b-4, and a high-voltage output cable 8, where the potential difference has the largest value in the Cockcroft-Walton circuit 1B.

The connection 7A is a third connection where the potential difference has the second largest value next to the connection 7B in the Cockcroft-Walton circuit 1B, and is electrically connected with the cathode of the diodes 3b-4 and the capacitor 2a-4. The diode 3b-4 has its anode connected to the second connection of the connection 7B and its cathode connected to the third connection of the connection 7A.

As shown in FIG. 5B, the end electrode 22 of the capacitor 2b-4 and the high-voltage output cable 8 have the same potential, and form a second space 9B where the electric field is substantially zero. The connection 7B is arranged so as not to protrude outside the second space 9B. As the electric field is close to zero around the connection 7B, the connection 7B will less likely have discharge or the like.

As shown in FIG. 5C, the end electrode 22 of the capacitor 2a-4 and the high-voltage output cable 8 have closer levels of potential, and form a third space 9A where the electric field is very low. The connection 7A is arranged so as not to protrude outside the third space 9A. As the electric field is extremely low around the connection 7A, the connection 7A will less likely have discharge.

This allows for securing insulation reliability of the Cockcroft-Walton circuit 1B, and for downsizing the entire device.

The Cockcroft-Walton circuit 1B is covered with a solid insulator such as epoxy resin as in the first embodiment.

The high-voltage output cable 8 is a conductor coated with an insulator. Coating material for the high-voltage output cable 8 may desirably have higher dielectric constant or conductivity than that for the Cockcroft-Walton circuit 1B as a whole. In addition, a cross section of the high-voltage output cable 8 may desirably have a curvature smaller than that of the connection 7A or 7B.

Fourth Embodiment

Figure 6A:
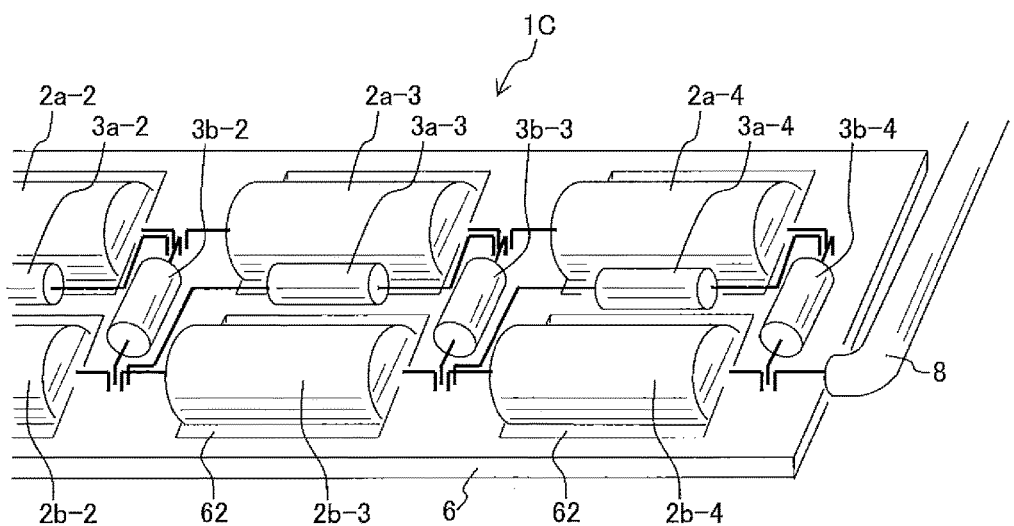
FIGS. 6A to 6D are diagrams showing a configuration of an end portion of a Cockcroft-Walton circuit according to a fourth embodiment.
Figure 6B:
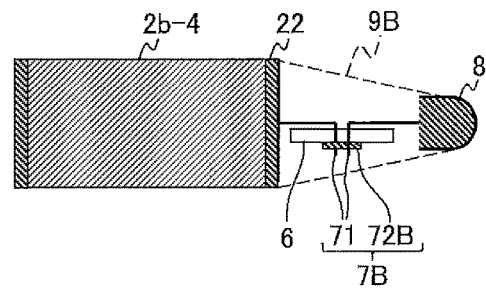
Figure 6C:
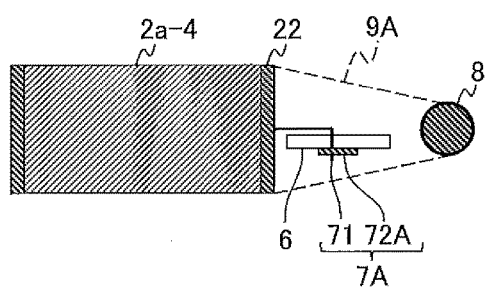
Figure 6D:
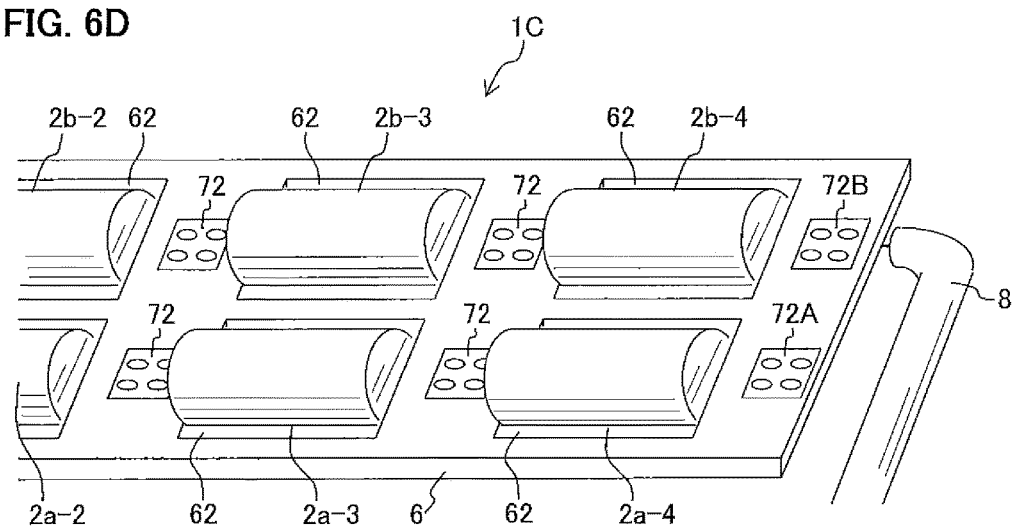

FIG. 6A to 6D are diagrams showing a configuration of an end portion of a Cockcroft-Walton circuit 1C in a fourth embodiment. FIG. 6A is a perspective view of a front surface of an end portion of the Cockcroft-Walton circuit 1C. FIG. 6B is a cross-sectional view around the connection 7B where the potential difference has the largest value. FIG. 6C is a cross-sectional view around the connection 7A where the potential difference has the second largest value. FIG. 6D is a perspective view of a back surface of the end portion of the Cockcroft-Walton circuit 1C.

As shown in FIG. 6A, two or more cavities 62 are formed on the front surface of the printed substrate 6 of the Cockcroft-Walton circuit 1C in the fourth embodiment. The cavities 62 have the capacitors 2a-2 to 2a-4 and the capacitors 2b-2 to 2b-4 fitted therein, respectively. The printed substrate 6 is mounted with the capacitors 2a-2 to 2a-4 and the capacitors 2b-2 to 2b-4. The printed substrate 6 is further mounted with the diodes 3a-2 to 3a-4 and the diodes 3b-2 to 3b-4.

The high-voltage output cable 8 is electrically connected at a point on the printed substrate 6 with one end of the capacitor 2b-4 and the anode of the diode 3b-4.

The Cockcroft-Walton circuit 1C as a whole is covered with a solid insulator such as epoxy resin as in the first to third embodiments. The high-voltage output cable 8 is a conductor coated with an insulator as in the third embodiment.

As shown in FIG. 6B, the connection 7B includes a land pattern 72B and the solder 71. The connection 7B is a second connection electrically connected with the capacitor 2a-4, the anode of the diode 3b-4, and the high-voltage output cable 8, where the potential difference has the largest value in the Cockcroft-Walton circuit 1C. The land pattern 72B is a second land pattern electrically connected with the high-voltage output cable 8 and the capacitor 2a-4.

The land pattern 72B and the connection 7B are arranged so as not to protrude outside the second space 9B between the end electrode 22 of the capacitor 2b-4 and the high-voltage output cable 8, as in the third embodiment. The connection 7B is arranged between the end electrode 22 of the capacitor 2b-4 and the high-voltage output cable 8, both having the same potential. Then, the electric field is close to zero around the connection 7B, and it will less likely cause discharge or the like.

As shown in FIG. 6C, the connection 7A includes a land pattern 72A and the solder 71. The connection 7A is a portion where the potential difference has the second largest value next to the connection 7B in the Cockcroft-Walton circuit 1C, and is electrically connected with the capacitor 2a-4 and the cathode of the diode 3b-4. The land pattern 72A is a third land pattern electrically connected with the diode 3b-4, which is connected at one end to the second land pattern of the land pattern 72B, and the capacitor 2a-4.

The land pattern 72A and the connection 7A are arranged so as not to protrude outside the third space 9A between the end electrode 22 of the capacitor 2a-4 and the high voltage output cable 8, as in the third embodiment. The connection 7A is arranged between the end electrode 22 of the capacitor 2a-4, having the same potential, and the high-voltage output cable 8, having a closer level of potential. Then, the electric field is very low around the connection 7A, and it will less likely cause discharge or the like.

This allows for ensuring insulation reliability of the Cockcroft-Walton circuit 1C, and for downsizing the entire device.

As shown in FIG. 6D, two or more cavities 62 and the land patterns 72, 72A, 72B are formed on the back surface of the printed substrate 6 of the Cockcroft-Walton circuit 1C in the fourth embodiment. The cavities 62 have the capacitors 2a-2 to 2a-4 and the capacitor 2b-2 to 2b-4 fitted therein, respectively. The capacitors 2a-2 to 2a-4 and the capacitors 2b-2 to 2b-4 are mounted on the printed substrate 6, and are electrically connected via the land patterns 72. The diodes 3a-2 to 3a-4 and the diodes 3b-2 to 3b-4, shown in FIG. 6A, are electrically connected to the respective land patterns 72.

The land pattern 72B is formed at one end of the capacitor 2b-4, and is electrically connected with the one end of the capacitor 2b-4, the high-voltage output cable 8, and the anode of the diode 3b-4, to constitute the connection 7B (see FIG. 6B).

The land pattern 72A is formed at one end of a capacitor 2a-4, and is electrically connected with the one end of the capacitor 2a-4 and the cathode of the diode 3b-4, to constitute the connection 7A (see FIG. 6C).

Fifth Embodiment

Figure 7A:
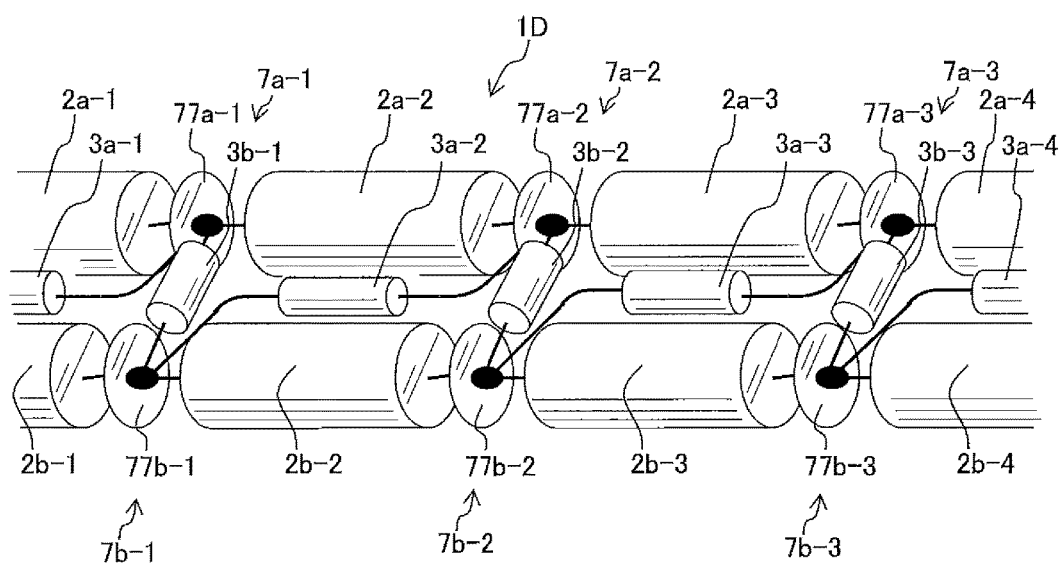
FIGS. 7A and 7B are diagrams showing a partial configuration of a Cockcroft-Walton circuit according to a fifth embodiment.
Figure 7B:
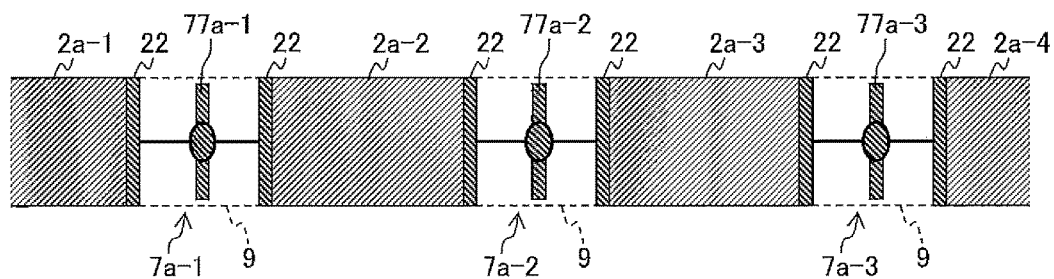

FIGS. 7A and 7B are diagrams showing a partial configuration of a Cockcroft-Walton circuit 1D in a fifth embodiment. FIG. 7A is a perspective view of the Cockcroft-Walton circuit 1D. FIG. 7B is a cross-sectional view of a series connection of the capacitors 2a-1 to 2a-4 of the Cockcroft-Walton circuit 1D.

As shown in FIG. 7A, the Cockcroft-Walton circuit 1D in the fifth embodiment has metal plates 77a-1 to 77a-3 electrically connected to the connections 7a-1 to 7a-3, respectively, and has metal plates 77b-1 to 77b-3 electrically connected to the connections 7b-1 to 7b-3, respectively, in addition to the same configuration as the Cockcroft-Walton circuit 1 in the first embodiment. Hereinafter, the metal plates 77a-1 to 77a-3 and the metal plates 77b-1 to 77b-3 are sometimes described simply as the metal plates 77, when no particular distinction is required.

As shown in FIG. 7B, each metal plate 77 is enclosed in the first space 9 formed by the end electrodes 22 of the capacitors 2 which are adjacent in series to each other, and arranged so as not to protrude outside the first space 9. For example, the metal plate 77a-1 is enclosed in the first space 9 formed by the end electrode 22 of the capacitor 2a-1 as one of a pair, and the end electrode 22 of the capacitor 2a-2 as the other of the pair, which is adjacent in series to the one of the pair.

The metal plate 77 may desirably have the same shape as the end electrode 22 of the capacitor 2, or may desirably be smaller in size than the end electrode 22. The metal plate 77 may be either a sheet or a plank, and may desirably be in a shape having no edge on the circumferential surface. The metal plate 77 is electrically connected to the connection 7, preferably such as by soldering, crimp contacting, or screw fastening.

The metal plate 77 has the same potential as the end electrodes 22 arranged on both sides thereof. In the first embodiment, a space having no electric field may not be made when the end electrodes 22 of the capacitors 2 adjacent in series to each other are mutually far apart. In the fifth embodiment, the space between the metal plate 77 and the end electrode 22 has no electric field. Then, the space having no electric field can be made even if the end electrodes 22 of the capacitors 2 adjacent in series to each other are mutually far apart, causing no discharge from the connection 7. This allows for securing insulation reliability, and for downsizing the entire device.

Sixth Embodiment

Figure 8A:
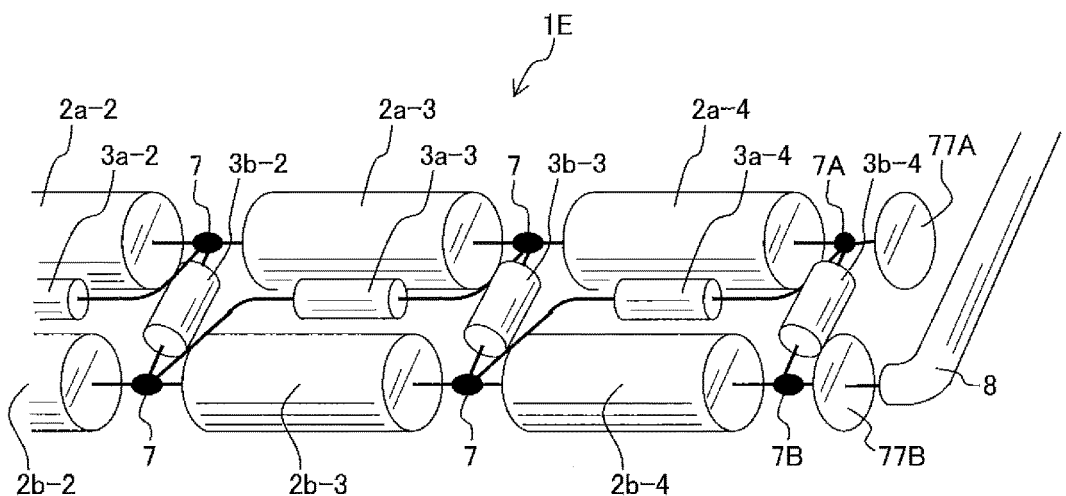
FIGS. 8A to 8C are diagrams showing a configuration of an end portion of a Cockcroft-Walton circuit according to a sixth embodiment.
Figure 8B:
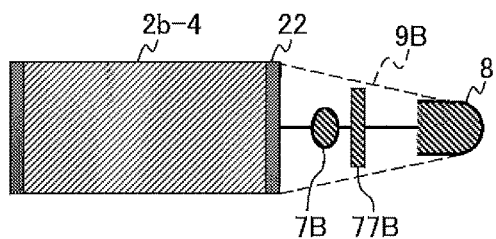
Figure 8C:
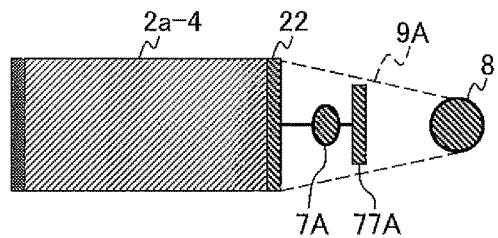

FIG. 8A to 8C are diagrams showing a configuration of an end portion of a Cockcroft-Walton circuit 1E in a sixth embodiment. FIG. 8A is a perspective view of the end portion of the Cockcroft-Walton circuit 1E. FIG. 8B is a cross-sectional view around the connection 7B where the potential difference has the largest value. FIG. 8C is a cross-sectional view around the connection 7A where the potential difference has the second largest value.

As shown in FIG. 8A, the connection 7B is a second connection electrically connected with the capacitor 2b-4, the anode of the diode 3b-4, and the high-voltage output cable 8, where the potential difference has the largest value in the Cockcroft-Walton circuit 1E. The connection 7B is electrically connected with a metal plate 77B. The connection 7A is a third connection electrically connected with the capacitor 2a-4 and the cathode of the diode 3b-4, where the potential difference has the second largest value next to the connection 7B in the Cockcroft-Walton circuit 1E. The connection 7A is electrically connected with a metal plate 77A. The diode 3b-4 has the anode connected to the connection 7B of the second connection and the cathode connected to the connection 7A of the third connection.

As shown in FIG. 8B, the end electrode 22 of the capacitor 2b-4 and the high-voltage output cable 8 have the same potential to form a second space 9B where the electric field is substantially zero. The metal plate 77B and the connection 7B are arranged so as not to protrude outside the second space 9B. The metal plate 77B is surrounded by the space where the electric field is close to zero, hardly causing discharge or the like. The connection 7B is located between the metal plate 77B and the end electrode 22 of the capacitor 2b-4, and surrounded by the space where the electric field is close to zero, again, hardly causing discharge or the like.

As shown in FIG. 8C, the end electrode 22 of the capacitor 2a-4 and the high-voltage output cable 8 have closer levels of potential to form a third space 9A where the electric field is extremely low. The metal plate 77A and the connection 7A are arranged so as not to protrude outside the third space 9A. The metal plate 77A is surrounded by the space where the electric field is extremely low, hardly causing discharge or the like. The connection 7A is located between the metal plate 77A and the end electrode 22 of the capacitor 2a-4, and surrounded by the space where the electric field is close to zero, again, hardly causing discharge or the like.

This allows for securing insulation reliability of the Cockcroft-Walton circuit 1E, and for downsizing the entire device.

Seventh Embodiment

FIG. 9A to 9D are diagrams showing a configuration of an end portion of a Cockcroft-Walton circuit 1F in a seventh embodiment. FIG. 9A is a perspective view of a front surface of the end portion of the Cockcroft-Walton circuit 1F. FIG. 9B is a cross-sectional view around the connection 7B where the potential difference has the largest value. FIG. 9C is a cross-sectional view around the connection 7A where the potential difference has the second largest value. FIG. 6D is a perspective view of a back surface of the end portion of the Cockcroft-Walton circuit 1F.

As shown in FIG. 9A, the front surface of the substrate 6 of the Cockcroft-Walton circuit 1F in the seventh embodiment is configured as in the fourth embodiment in FIG. 6A. In the seventh embodiment, a metal plate 77B is further arranged in the vicinity of a portion of the printed substrate 6 to which the high-voltage output cable 8 is electrically connected. In the seventh embodiment, a metal plate 77A is further arranged in the vicinity of a portion of the printed substrate 6 to which one end of the capacitor 2a-4 and the cathode of the diode 3b-4 are electrically connected.

The Cockcroft-Walton circuit 1F as a whole is covered with a solid insulator such as epoxy resin as in the fourth embodiment. The high-voltage output cable 8 is a conductor coated with an insulator as in the fourth embodiment.

As shown in FIG. 9B, the connection 7B includes the land pattern 72B and the solder 71, and is further electrically connected with the metal plate 77B. The connection 7B is a second connection electrically connected with the capacitor 2a-4, the anode of the diode 3b-4, and the high-voltage output cable 8, where the potential difference has the largest value in the Cockcroft-Walton circuit 1F.

The metal plate 77B is arranged so as not to protrude outside the second space 9B between the end electrode 22 of the capacitor 2b-4 and the high-voltage output cable 8, which will have the same potential. This will less likely cause discharge or the like from the metal plate 77B. The connection 7B inclusive of the land pattern 72B and the solder 71 is arranged between the end electrode 22 of the capacitor 2b-4 and the metal plate 77B, which have the same potential. This makes the connection 7B surrounded by the space where the electric field is close to zero, hardly causing discharge or the like.

As shown in FIG. 9C, the connection 7A includes the land pattern 72A and the solder 71, and is further electrically connected with the metal plate 77A. The connection 7A is a portion where the potential difference has the largest value next to the connection 7B in the Cockcroft-Walton circuit 1F, and is electrically connected with the capacitor 2a-4 and the cathode of the diode 3b-4.

The metal plate 77A is arranged so as not to protrude outside a third space 9A between the end electrode 22 of the capacitor 2a-4 and the high-voltage output cable 8, which have closer levels of potential. This makes the metal plate 77A surrounded by the space where the electric field is extremely low, hardly causing discharge or the like.

The connection 7A inclusive of the land pattern 72A is arranged between the end electrode 22 of the capacitor 2a-4 having the same potential, and the metal plate 77A having the same potential. This makes the connection 7A surrounded by the space where there is no electric field, hardly causing discharge or the like from the connection 7A.

This allows for securing insulation reliability of the Cockcroft-Walton circuit 1F, and for downsizing the entire device.

As shown in FIG. 9D, the back surface of the printed substrate 6 of the Cockcroft-Walton circuit 1F in the seventh embodiment is configured as in the fourth embodiment in FIG. 6A. In the seventh embodiment, the metal plate 77B is arranged next to, and electrically connected to, the land pattern 72B formed on the back surface of the printed substrate 6. The metal plate 77A is arranged next to, and electrically connected to, the land pattern 72A formed on the back surface of the printed substrate 6.

These metal plates 77A, 77B suppress discharge from the portions of the Cockcroft-Walton circuit 1F, where the potential difference has large values. This allows for securing insulation reliability of the Cockcroft-Walton circuit 1F, and for downsizing the entire device.

Modifications

The present invention is not limited to the embodiments described above, and includes various modifications. For example, embodiments hereinabove are described in detail in order to illustrate the present invention, and are not necessarily limited to include entire configurations as described. A part of the configuration of an embodiment may be replaced by the configuration of another embodiment, and/or the configuration of an embodiment may be added with the configuration of another embodiment. In addition, a part of the configuration of each embodiment may be removed, or added with and/or replaced by another configuration.

Each configuration, function, process, and/or processing means described above may be implemented in part or entirely by hardware such as an integrated circuit. Each configuration and/or function described above may be implemented by software by the processor interpreting and executing programs for implementing the respective functions. Information such as program for implementing respective functions, tables, and files can be stored in a recording device such as a memory, a hard disk, and an SSD (Solid State Drive), or a recording medium such as a flash memory card, and a DVD (Digital Versatile Disk).

In each embodiment, the control lines and information lines are shown for the purpose of illustration, and all control lines and information lines in the product are not necessarily shown. In fact, it may be safe to say that almost all components are connected with one another.

Following modifications a) to d) can be made to the present invention, for example.

a) The capacitor 2 constituting the Cockcroft-Walton circuit is not limited to a film capacitor, and a ceramic capacitor can suitably be used, for example.

b) The insulator covering the Cockcroft-Walton circuit is not limited to a solid insulator such as epoxy resin, and a liquid insulator such as insulating oil or a gaseous insulator such as sulfur hexafluoride gas may be used for covering. Further, two or more of the solid insulator, the liquid insulator, and the gaseous insulator may be used for covering.

c) The high-voltage output cable 8 is not limited to a conductor coated with an insulator, and a conductor coated with a semiconductor or a conductor alone may be used.

d) The Cockcroft-Walton circuit of the present invention is not limited to be used in the X-ray generator, and may be used in a charged particle accelerator, an electron microscope, an electrostatic precipitator, or an electrostatic coating machine.

The invention claimed is:

1. A high-voltage generation device comprising:
two or more capacitors that are connected in series, each having end electrodes at both ends;
a first connection that is electrically connected with one capacitor and the other capacitor, which are adjacent in series to each other, and is arranged not to protrude outside a first space between an end electrode of said one capacitor on the first connection side and an end electrode of said the other capacitor on the first connection side;
a diode that has one end electrically connected to the first connection;
a high-voltage output cable that outputs a high voltage; and
a second connection that is electrically connected with the high-voltage output cable and a capacitor, and is arranged not to protrude outside a second space between an end electrode of said capacitor on the second connection side and the high-voltage output cable.

2. The high-voltage generation device according to claim 1, wherein the diode is electrically connected to the first connection by soldering.

3. The high-voltage generation device according to claim 1, further comprising:
a metal plate that is electrically connected to the first connection,
wherein the metal plate is arranged not to protrude outside the first space, and
the one end of the diode is electrically connected to either the metal plate or the first connection.

4. The high-voltage generation device according to claim 1, further comprising:
a metal plate that is electrically connected to the second connection,
wherein the metal plate is arranged not to protrude outside the second space.

5. The high-voltage generation device according to claim 1, further comprising:
a third connection that is electrically connected with one end of a diode, the other end of which is connected to the second connection, and a capacitor, and is arranged not to protrude outside a third space between an end electrode of said capacitor on the third connection side and the high-voltage output cable.

6. The high-voltage generation device according to claim 5, further comprising:
a metal plate that is electrically connected to the third connection,
wherein the metal plate is arranged not to protrude outside the third space.

7. The high-voltage generation device according to claim 1, further comprising:
a printed substrate that includes:
two or more first land patterns, each being electrically connected with one end of said one capacitor, one end of said the other capacitor, and the one end of the diode; and
two or more cavities that are fitted with the two or more capacitors,
wherein the first land pattern is arranged not to protrude outside the first space.

8. The high-voltage generation device according to claim 7, wherein the printed substrate further includes:
a second land pattern that is electrically connected with the high-voltage output cable and a capacitor,
wherein the second land pattern is arranged not to protrude outside a second space between an end electrode of said capacitor and the high-voltage output cable.

9. The high-voltage generation device according to claim 8, further comprising:
a metal plate that is electrically connected to the second land pattern,
wherein the metal plate is arranged not to protrude outside the second space.

10. The high-voltage generation device according to claim 8, wherein the printed substrate further includes:
a third land pattern that is electrically connected with one end of a diode, the other end of which is connected to the second land pattern, and a capacitor,
wherein the third land pattern is arranged not to protrude outside a third space between an end electrode of said capacitor and the high-voltage output cable.

11. The high-voltage generation device according to claim 10, further comprising:
a metal plate that is electrically connected to the third land pattern,
wherein the metal plate is arranged not to protrude outside the third space.

12. A high-voltage generation device, comprising:
two or more capacitors that are connected in series, each having end electrodes at both ends;
a first connection that is electrically connected with one capacitor and the other capacitor, which are adjacent in series to each other, and is arranged not to protrude outside a first space between an end electrode of said one capacitor on the first connection side and an end electrode of said the other capacitor on the first connection side; and a diode that has one end electrically connected to the first connection, wherein each capacitor further has a male screw on one end electrode and a female screw on the other end electrode, the first connection is configured to have the male screw of said one capacitor fastened to the female screw of said the other capacitor, and a terminal arranged on the one end of the diode is sandwiched between the male screw and the female screw for electrically connecting the diode to the first connection.

13. The high-voltage generation device according to claim 12, further comprising:

a high-voltage output cable that outputs a high voltage; and a second connection that is electrically connected with the high-voltage output cable and a capacitor, and is arranged not to protrude outside a second space between an end electrode of said capacitor on the second connection side and the high-voltage output cable.

14. An X-ray generation device comprising a high-voltage generation device that includes:

two or more capacitors that are connected in series, each having end electrodes at both ends;

a connection that is electrically connected with one capacitor and the other capacitor, which are adjacent in series to each other, and is arranged not to protrude outside a first space between an end electrode of said one capacitor on the connection side and an end electrode of said the other capacitor on the connection side;

a diode that has one end electrically connected to the connection;

a high-voltage output cable that outputs a high voltage; and a second connection that is electrically connected with the high-voltage output cable and a capacitor, and is arranged not to protrude outside a second space between an end electrode of said capacitor on the second connection side and the high-voltage output cable.

* * * * *